United States Patent
Louis

(10) Patent No.: US 11,932,085 B2
(45) Date of Patent: Mar. 19, 2024

(54) VEHICLE INTERIOR PANEL WITH SPIRAL DIFFUSER

(71) Applicant: Faurecia Interior Systems, Inc., Auburn Hills, MI (US)

(72) Inventor: Benjamin Louis, Bloomfield Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 343 days.

(21) Appl. No.: 16/867,143

(22) Filed: May 5, 2020

(65) Prior Publication Data
US 2021/0347230 A1    Nov. 11, 2021

(51) Int. Cl.
*B60H 1/34*    (2006.01)
*B60H 1/24*    (2006.01)

(52) U.S. Cl.
CPC ............. *B60H 1/34* (2013.01); *B60H 1/242* (2013.01)

(58) Field of Classification Search
CPC ........ B60H 1/242; B60H 1/34; B60H 1/3457; B60Q 2500/20; B60Q 3/00
USPC ........................................................ 454/152
See application file for complete search history.

(56) References Cited

U.S. PATENT DOCUMENTS

| 2,363,839 | A | * | 11/1944 | Demuth | F24F 1/0287 165/125 |
| 3,401,620 | A | * | 9/1968 | Armstrong | B60H 1/262 454/145 |
| 5,090,301 | A | * | 2/1992 | Soethout | B60H 1/247 454/159 |
| 5,800,259 | A | * | 9/1998 | Olney | F24F 13/08 454/109 |
| 6,149,513 | A | * | 11/2000 | Lyu | B60H 1/3407 454/108 |
| 2016/0102884 | A1 | * | 4/2016 | Terai | B60H 1/3428 454/335 |
| 2017/0129313 | A1 | * | 5/2017 | Avendano Arenas | B60H 3/0028 |
| 2018/0257553 | A1 | * | 9/2018 | Salter | B60R 13/0212 |

FOREIGN PATENT DOCUMENTS

| DE | 102008013654 A1 | 9/2009 |
| EP | 1557619 A1 | 1/2004 |
| FR | 2728530 B1 | 6/1996 |
| GB | 391324 A | 4/1933 |

\* cited by examiner

*Primary Examiner* — Avinash A Savani
*Assistant Examiner* — Dana K Tighe
(74) *Attorney, Agent, or Firm* — Reising Ethington P.C.

(57) ABSTRACT

A vehicle interior panel includes a diffuser spanning an air discharge opening. The diffuser has a spiral slot formed therethrough such that changing an axial distance between opposite ends of the slot changes an air flow capacity of the diffuser. The diffuser has an elegant and simplified design and can be made as one piece from a sheet material. Air is discharged from the diffuser radially and substantially equally in all radial directions. The diffuser can also function to provide ambient light from a light source and/or to deliver an air freshening agent to the passenger cabin.

19 Claims, 3 Drawing Sheets

VEHICLE INTERIOR PANEL WITH SPIRAL DIFFUSER

TECHNICAL FIELD

The present disclosure is related generally to vehicle interiors and, more particularly, to vehicle interior panels through which air is discharged into the passenger cabin.

BACKGROUND

Vehicle HVAC systems typically include an adjustment mechanism that allows users to control the amount and/or direction of the flow of conditioned air from an air vent. Improvements to such mechanisms are usually related to increased amounts of available user control, often resulting in complex mechanisms with a multiplicity of individual pieces assembled together.

In one example, U.S. Patent Application Publication No. 2012/0009861 by Mercey et al. discloses an air outlet device with a first set of fins that are rotatable about a horizontal axis, a second set of fins behind the first set of fins that are rotatable about a vertical axis, and a deflector behind the second set of fins. Each set of fins has a dedicated actuator, and the deflector is linked to the movement of the second set of fins and further guided within a slot in the air supplying duct. The construction requires some ten to twenty individual pieces in the assembly.

SUMMARY

An illustrative vehicle interior panel includes an air discharge opening and a diffuser spanning the opening. The diffuser has a spiral slot formed therethrough such that changing an axial distance between opposite ends of the slot changes an air flow capacity of the diffuser.

In various embodiments, the diffuser has a closed condition at which air flow from the air discharge opening is blocked.

In various embodiments, the opposite ends of the spiral slot are coplanar in the closed condition.

In various embodiments, one of the opposite ends of the spiral slot is stationary relative to the air discharge opening. The air flow capacity of the diffuser increases when the other end of the spiral slot moves in a downstream direction.

In various embodiments, the diffuser forms a part of the decorative side of the panel.

In various embodiments, the diffuser is formed as a single piece from a sheet material with the spiral slot formed through the sheet material.

In various embodiments, the spiral slot is formed at an oblique angle such that a spiral edge at an outer side of the diffuser lies radially outward from a corresponding spiral edge at an inner side of the diffuser.

In various embodiments, the diffuser comprises a central portion, a base surrounding the central portion, and a spiral strip interconnecting the central portion and the base.

In various embodiments, portions of the spiral strip oppose each other across the spiral slot. The portions that oppose each other across the spiral slot are in contact with each other when the diffuser is in a closed condition and axially spaced from each other when the diffuser is in an open condition.

In various embodiments, the central portion, the base, and the spiral strip all lie in the same plane when the diffuser is in the closed condition.

In various embodiments, the diffuser is not adjustable to change a direction of airflow from the diffuser.

In various embodiments, the vehicle interior panel includes a light source located upstream from the diffuser such that light from the light source is emitted through the spiral slot when the diffuser is in an open condition.

In various embodiments, the diffuser is biased toward a closed condition.

In various embodiments, the diffuser is passively regulated such that increased pressure upstream of the diffuser causes said axial distance to increase.

In various embodiments, the vehicle interior panel is configured to deliver an air freshening agent through the diffuser.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel equipped with a diffuser that has an elegant and simple design and can be made as a single piece from a sheet of material. Air is discharged from the diffuser radially and substantially equally in all radial directions with limited axial air flow. The diffuser may thus be considered more as an air distributor than as an air director and may be useful in non-HVAC applications such as fragrance distribution within a vehicle passenger cabin.

Figure 1:
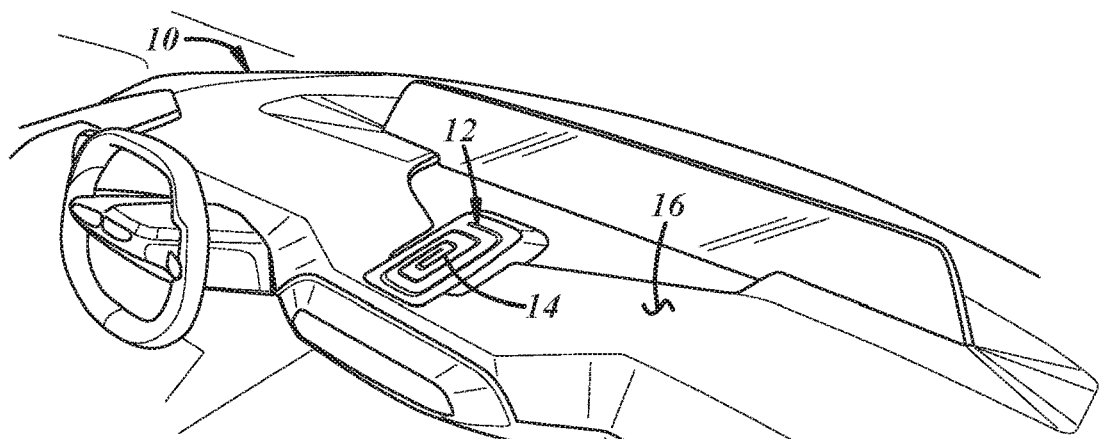
FIG. 1 is a perspective view of an illustrative vehicle interior panel including embodiments of a diffuser.

FIG. 1 illustrates a vehicle interior panel 10 equipped with embodiments of a diffuser 12. The panel 10 of FIG. 1 is an instrument panel installed at the front end of a vehicle passenger cabin and includes a horizontally oriented diffuser 12 along a central top side of the panel and a vertically oriented diffuser 12 at an end of the panel along a passenger side of the cabin. While shown as part of an instrument panel 10 in FIG. 1, the diffuser 12 is applicable to any vehicle interior panel, such as a door panel, roof panel, console panel, seat panel, etc.

Each diffuser 12 is in the form of a generally flat subpanel with a spiral slot 14 formed therethrough and forms part of a visible decorative surface 16 of the panel 10. Stated differently, the diffuser 12 is more than merely a flow regulator hidden along the length of a fluid flow conduit; rather, it serves an additional function as an integral and dynamic part of the aesthetic design of the vehicle interior, adding visual interest as a modern alternative to conventional grille- or grate-style air vents. In FIG. 1, each of the diffusers 12 is illustrated in a closed condition at which air flow through the diffuser is substantially blocked. As described further below, the diffuser 12 is configured to separate along the spiral slot 14 to assume an open configuration and permit air flow.

Figure 2:
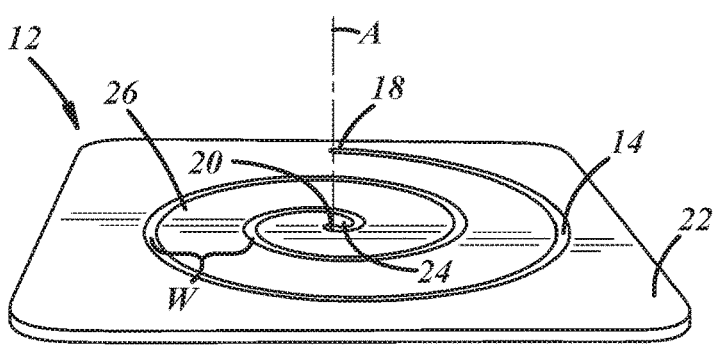
FIG. 2 is a perspective view of an exemplary diffuser in a closed condition.
Figure 3:
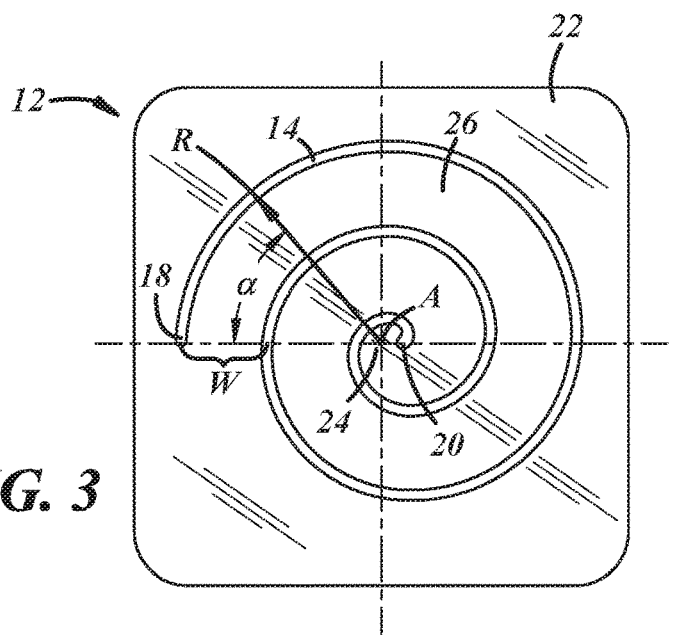
FIG. 3 is a plan view of the diffuser of FIG. 2.

FIG. 2 is a perspective view and FIG. 3 is a plan view of an exemplary diffuser 12 shown separately from the remainder of the panel. This diffuser 12 is also illustrated in the closed condition. The spiral slot 14 of this example has a round or circular configuration, while the examples of FIG. 1 have a generally rectangular configuration. The spiral slot 14 may take on other regular or irregular shapes and is continuous between a first or radially outer end 18 and a second or radially inner end 20. In some cases, the diffuser 12 includes more than one spiral slot 14, either arranged about the same central axis (A) or about a different axis such that the entirety of each individual slot is formed at a separate location along the diffuser 12.

The slot 14 is defined along a path located a distance (R) from the central axis (A), where the distance (R) decreases continuously as a function of angle ($\alpha$) from the first end 18 to the second end 20. In the illustrated example, the relationship between the angle ($\alpha$) and the distance (R) is linear, with the distance (R) decreasing by a constant amount (W) every 360 degrees—i.e., $R=R_1-\alpha W/360$, where $R_1$ is the distance (R) at the first end 18 of the slot 14. Non-linear relationships are also possible, with the amount (W) increasing or decreasing with angle ($\alpha$). To be considered a spiral for purposes of this disclosure, the angular distance ($\alpha$) between the ends 18, 20 of the slot 14 must be at least 360 degrees.

The diffuser 12 includes a base 22, a central portion 24, and a spiral strip or coil 26 that interconnects the base with the central portion. These features of the diffuser 12 are at least partially defined by the spiral slot 14. The spiral strip 26 is defined between successive 360 degree turns of the slot 14. The strip 26 has a width (W) and is connected to the base 22 at the first end 18 and to the central portion 24 at the second end 20. The base 22 surrounds the central portion 24 and the entire slot 14, though it is possible for the radially outer end 18 of the slot to be located along an edge of the base.

In the illustrated example, the diffuser 12 has a monolithic or unitary structure, meaning it is formed as a single piece from a sheet material with the spiral slot 14 formed through the thickness of the sheet material. The sheet material preferably exhibits elastic behavior within the intended range of movement of the spiral strip 26 between the closed position and the open position (e.g., FIGS. 4 and 6) such that the diffuser is naturally biased toward the closed position. The sheet material may for example be a generally flat sheet of plastic material having a thickness from 0.5 mm to 2.5 mm. In other examples, the base 22 and/or the central portion 24 are made separately from the spiral strip 26 and assembled together to form the diffuser 12. In yet other examples, the spiral strip 26 is snapped into or otherwise attached within an opening of the panel 10 such that the surrounding panel forms the base.

The slot 14 may be formed through an otherwise solid sheet of material via a laser, knife, or other cutting tool and may have a width in a range from 0 to 2.0 mm. For example, the slot 14 may be formed with a knife that cuts the sheet material while removing substantially no material, leaving a zero-width slot (i.e., a slit) through the material. Or the slot 14 may be formed with a laser, mill, or other material removal tool, resulting in a non-zero slot width. A non-zero slot width permits some nominal amount of air flow through the diffuser 12 even in the closed condition.

In other embodiments, the diffuser 12 is formed as a single piece by injection molding or by die cutting a sheet material. The diffuser 12 is also considered to be formed as a single piece from a sheet material when the sheet material is a multi-layer material. For example, the sheet material may be a plastic material covered in a decorative material with the slot 14 formed through both layers. Or the sheet material may include a metallic layer to provide additional stiffness to the spiral strip 26. Other constructions are possible.

Figure 4:
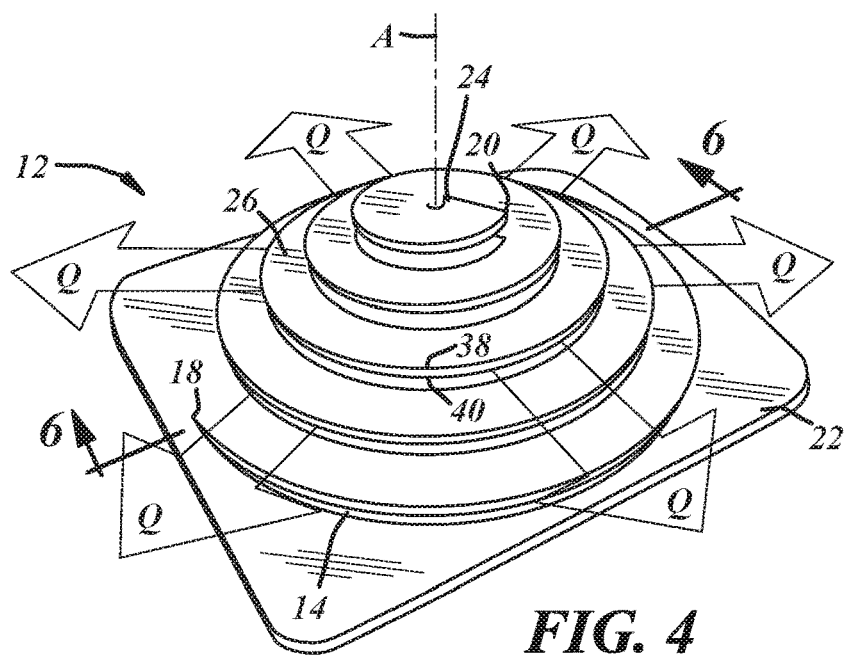
FIG. 4 is a perspective view of an exemplary diffuser in an open condition.
Figure 5:
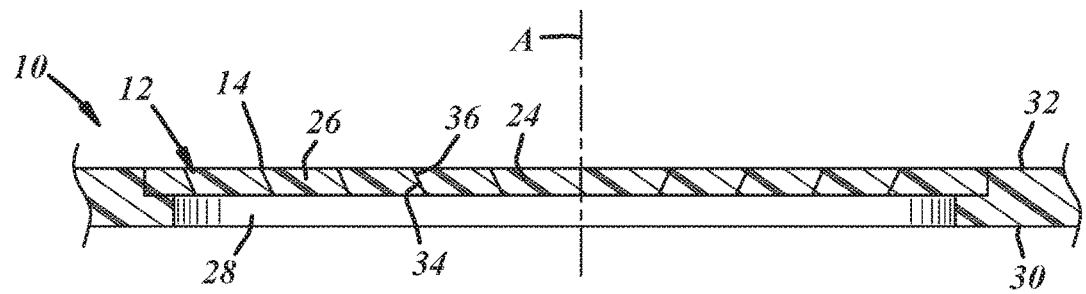
FIG. 5 is a cross-sectional view of the diffuser of FIG. 4 in the closed condition.
Figure 6:
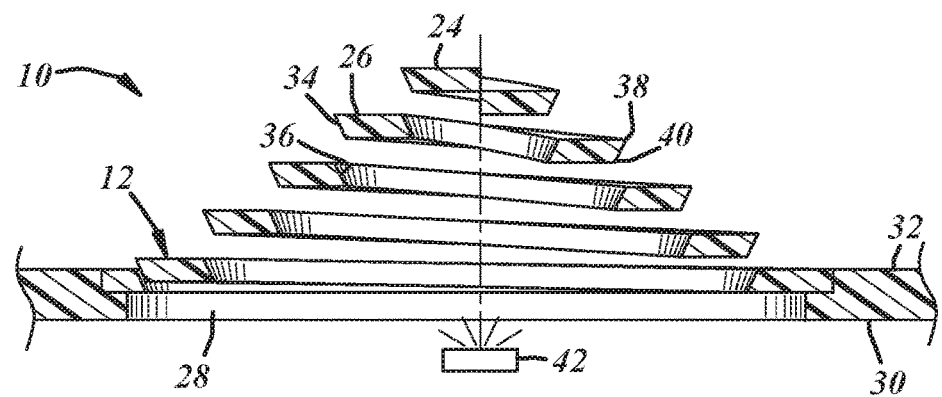
FIG. 6 is a cross-sectional view of the diffuser of FIG. 5 in an open condition.

FIGS. 4-6 are respective views of the spiral-slotted diffuser 12 illustrating its operation. FIG. 4 is a perspective view illustrating the diffuser 12 in an open condition, and FIGS. 5 and 6 are cross-sectional views illustrating the diffuser 12 in respective closed and open conditions as part of the interior panel 10.

The diffuser 12 spans an air discharge opening 28 of the panel 10. The air discharge opening 28 may for example be located at a discharge end of an air duct (not shown) located along a back side 30 of the panel 10. In FIGS. 5 and 6, the portion of the panel 10 surrounding the diffuser 12 and air discharge opening 28 is shown simplified as a single layer. It should be recognized, however, that the panel 10 may include additional layers, such as a decorative layer at a visible outer side 32 of the panel and a cushion layer beneath the decorative layer.

By virtue of the spiral slot 14, a change in axial distance between the opposite ends 18, 20 of the slot results in a change in the air flow capacity of the diffuser. In this example, the diffuser 12 is in the closed condition in FIG. 5 such that the opposite ends 18, 20 of the slot 14 are effectively coplanar. FIGS. 4 and 6 show the diffuser 12 in an open condition at which the axial distance (i.e., the distance in the direction of the axis A) between the ends 18, 20 is increased relative to the closed condition. As a result of this change, the diffuser 12 separates along the spiral slot 14, thereby increasing the air flow capacity (e.g., volumetric or mass flow) of the diffuser. Decreasing the axial distance between the opposite ends 18, 20 of the slot 14 or the opposite ends of the strip 26 results in a decrease in the air flow capacity of the diffuser 12.

The radially outer end 18 of the slot 14 is stationary relative to the air discharge opening 28 and the remainder of the panel 10, while the radially inner end 20 is movable relative to the remainder of the panel. In this particular example, the slot 14 is a zero-width slit such that portions 34, 36 of the spiral strip 26 that oppose each other across the slot 14 are in contact with each other in the closed condition, thereby effectively blocking air flow through the diffuser 12. In the open condition, those same portions 34, 36 of the strip 26 are axially spaced from each other so that air flow is permitted through the diffuser 12. More specifically, air flow (Q) is permitted between successive turns of the spiral strip 26, as shown in FIG. 4.

In this example, the diffuser 12 opens toward or into the passenger cabin, which is to say that the center portion 24 of the diffuser moves away from the surrounding portions of the panel 10 and further into the passenger cabin to increase diffuser air flow capacity. This direction may be referred to as a downstream direction relative to the direction of air flow before it reaches the diffuser 12. Similar changes in air flow capacity of the diffuser 12 are also possible by causing the diffuser to open in the opposite direction—i.e., in the upstream direction of air flow through the discharge opening 28.

The diffuser 12 can effectively change the direction of air flow from a substantially axial direction when reaching and passing through the air discharge opening 28, to a substantially radial direction when exiting the diffuser. Moreover, the radial air flow (Q) is present around the full perimeter of the spiral strip 26 and may be equally distributed in all radial directions. With a vertically oriented diffuser 12, such as that on the passenger side of the instrument panel 10 of FIG. 1, this diffusion of air flow from the vehicle HVAC system is particularly advantageous when the vehicle is first started in a cold environment (e.g., to prevent cold air from blowing directly at vehicle occupants when the heating system is first activated) or in a hot environment (e.g., to prevent hot air from blowing directly at vehicle occupants when the air conditioning system is first activated). With a horizontally oriented diffuser 12 atop the instrument panel as in FIG. 1, the diffuser 12 can also provide windscreen defrosting air flow from the same air discharge opening as cabin heating air flow due to the 360-degree distribution of air flow.

The illustrated diffuser 12 is self-regulating, meaning that it requires no actuation to operate, other than pressurized air at the discharge opening 28. From the closed condition, an increase in air pressure at the air discharge opening 28 (e.g., via an HVAC blower) will eventually cause the diffuser 12 to separate along the slot 14 to allow air to flow through the diffuser. Further increases in air pressure at the upstream side of the diffuser 12 cause the diffuser to further open. An equilibrium open condition will be achieved at each different upstream pressure level, with the spiral strip 26 acting as a spring that is self-biased toward the closed condition.

In other embodiments, a separate biasing element such as a spring may be provided to bias the diffuser 12 toward the closed condition, in opposition to the direction of airflow through the air discharge opening, or in opposition to a user initiated movement of the diffuser. In yet other embodiments, an actuator may be provided to initiate movement of the diffuser 12 and/or to maintain the diffuser in the open or closed position. For example, an electric actuator such as a motor or solenoid can be arranged to move the central portion 24 of the diffuser 12 back and forth in the axial direction to change the air flow capacity of the diffuser. In another example, a push-push type latch mechanism can be employed to move the central portion 24 of the diffuser between corresponding open and closed conditions. In another example, an axial post may extend from a back side of the diffuser 12 and engage a receptacle with a friction-fit sliding connection to allow a user to push or pull on a tab or button on the visible side of the diffuser to adjust the air flow capacity of the diffuser between the closed condition and a fully open condition, with the friction-fit maintaining the desired diffuser condition.

The slot 14 of the diffuser of FIGS. 4-6 is formed through the thickness of the diffuser 12 at an oblique angle such that a spiral edge 38 at an outer side of the diffuser 12 lies radially outward from a corresponding spiral edge 40 at an inner side of the diffuser. In other words, the slot 14 is not formed perpendicular with the planar surfaces of the diffuser 12. One advantage of this configuration is the increased surface area at the interface where portions 34, 36 of the spiral strip 26 oppose each other across the slot, which offers a better seal in the closed condition. The oblique slot 14 also provides a self-supporting function for the diffuser 12 when installed in the horizontal orientation such that each turn of the spiral strip 26 is supported by an adjacent turn. In other embodiments, the panel 10 may include a support member, such as an X-shaped brace across the air discharge opening 28, to support the diffuser 12 in the closed condition and to prevent the diffuser from moving in the upstream direction.

As shown schematically in FIG. 6, the panel 10 may also include a light source 42 located upstream from the diffuser 12 such that light from the light source is emitted through the spiral slot 14 when the diffuser is in the open condition. The light source 42 may be configured to operate independently from the diffuser 12 or in conjunction with the diffuser such that the light source is powered on only when the diffuser is in an open condition. Light from the light source 42 may be emitted through the diffuser 12 in the closed condition where the diffuser includes a spiral slot 14 of non-zero width or where the diffuser includes other openings or transparent or translucent portions. The diffuser 12 thereby serves an additional function as an ambient light source or accent lighting for the vehicle interior.

A unique feature of the spiral-slotted diffuser 12, particularly when configured as an HVAC, air vent through which conditioned air is delivered to the passenger cabin (e.g., in FIG. 1), is the absence of directional control of the air flow (Q) by a user. The air flow (Q) from the diffuser is essentially radial. While a lack of directional control may be viewed detrimentally in the prior art, the above-described diffuser 12 includes other benefits such as 360-degree distribution of air flow and a simple construction with added visual interest. The diffuser 12 may be ideal for use in a roof-mounted interior panel, for example, for a more even distribution of conditioned air. It is also possible to mount the diffuser 12 at the discharge end of a swiveling or otherwise pivotable air duct to combine the advantages of conventional air vents with those of the diffuser.

Figure 7:
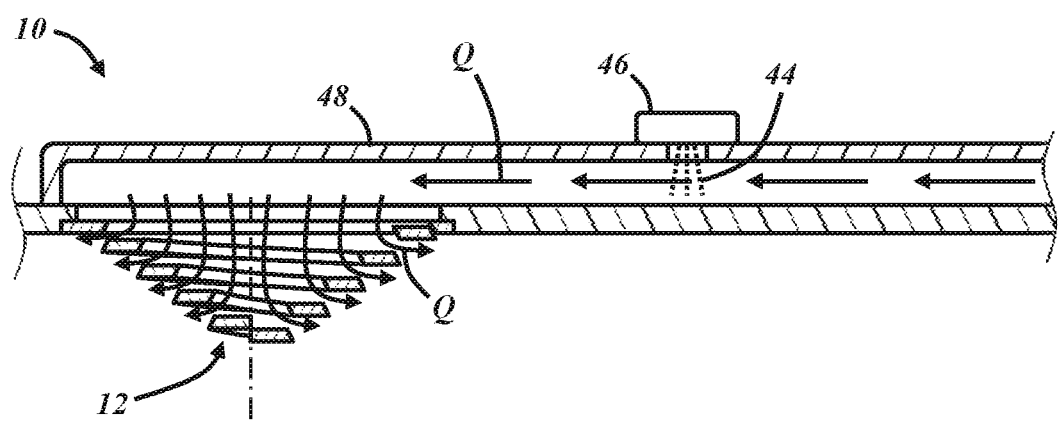
FIG. 7 is a cross-section view of the diffuser of FIG. 6 distributing a freshening agent.

FIG. 7 is a cross-sectional view illustrating an embodiment of the interior panel 10 in which the spiral diffuser 12 is configured to deliver an air freshening agent 44 to the vehicle passenger cabin. In this example, the panel 10 is a roof panel with a freshening agent source 46 mounted along an air duct 48 on the non-visible side of the panel. The diffuser 12 is illustrated in the open condition such that air flow (Q) along the duct 48 receives the air freshening agent 44 as it passes by the source 46 and is subsequently delivered into the passenger cabin via the diffuser. The spiral diffuser 12 is particularly suited for use with a freshening agent 44 due to its characteristic 360-degree radial distribution of the discharged air.

The air freshening agent 44 can include a perfume or fragrance of any type to add a desired scent to the air flow (Q), or it can be an odor neutralizer meant to reduce odors in the passenger cabin. In some embodiments, the air freshening agent 44 may be or may include a disinfectant that helps reduce unwanted odor-causing or harmful microbes in the passenger cabin. The air freshening agent 44 may be emitted from the source 46 and into the air duct 48 as an atomized liquid, as shown, or as a vapor. For example, the freshening agent source 46 may present the freshening agent 44 as a liquid absorbed in a porous material with the liquid evaporating as the air flow passes over it. In other examples, the source 46 is a solid material that sublimes to provide the freshening agent 44 in vapor form. The illustrated configuration is only an example, as the panel 10 can be any vehicle interior panel in any orientation. Indeed, forced air flow is not required in a duct upstream from the diffuser. The diffuser 12 may simply span a discharge opening 28 behind which a freshening agent source 46 is mounted, and a user can open or close the diffuser as desired to respectively permit or block the freshening agent 44 from entering the passenger cabin.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel comprising an air discharge opening and a diffuser spanning the opening, the diffuser having a spiral slot formed therethrough such that changing an axial distance between opposite ends of the slot changes an air flow capacity of the diffuser, wherein the diffuser has a closed condition in which said opposite ends are coplanar with a base of the diffuser.

2. The vehicle interior panel of claim 1, wherein air flow from the air discharge opening is blocked in the closed condition.

3. The vehicle interior panel of claim 1, wherein one of said opposite ends is stationary relative to the air discharge opening, and wherein said air flow capacity increases when the other of said opposite ends moves in a downstream direction.

4. The vehicle interior panel of claim 1, wherein the diffuser forms a part of a decorative side of the panel.

5. The vehicle interior panel of claim 1, wherein the diffuser is formed as a single piece from a sheet material with the spiral slot formed through the sheet material.

6. The vehicle interior panel of claim 1, wherein the spiral slot is formed at an oblique angle such that a spiral edge at an outer side of the diffuser lies radially outward from a corresponding spiral edge at an inner side of the diffuser.

7. The vehicle interior panel of claim 1, wherein the diffuser comprises a central portion surrounded by the base and a spiral strip interconnecting the central portion and the base.

8. The vehicle interior panel of claim 7, wherein portions of the spiral strip oppose each other across the spiral slot, said portions being in contact with each other when the diffuser is in the closed condition and axially spaced from each other when the diffuser is in an open condition.

9. The vehicle interior panel of claim 7, wherein the central portion, the base, and the spiral strip all lie in the same plane when the diffuser is in the closed condition.

10. The vehicle interior panel of claim 1, wherein the diffuser is not adjustable to change a direction of airflow from the diffuser.

11. The vehicle interior panel of claim 1, further comprising a light source located upstream from the diffuser such that light from the light source is emitted through the spiral slot when the diffuser is in an open condition.

12. The vehicle interior panel of claim 1, wherein the diffuser is biased toward the closed condition.

13. The vehicle interior panel of claim 1, wherein the diffuser is passively regulated such that increased pressure upstream of the diffuser causes said axial distance to increase.

14. The vehicle interior panel of claim 1, wherein the panel is configured to deliver an air freshening agent through the diffuser.

15. The vehicle interior panel of claim 1, wherein air flowing in an axial direction upstream from the diffuser is discharged from the diffuser in a radial direction.

16. A vehicle interior panel comprising an air discharge opening and a diffuser spanning the opening, the diffuser having a spiral slot formed therethrough such that changing an axial distance between opposite ends of the slot changes an air flow capacity of the diffuser, wherein the diffuser is passively regulated such that increased pressure upstream of the diffuser causes said axial distance to increase.

17. The vehicle interior panel of claim 16, wherein the diffuser has a closed condition in which said opposite ends are coplanar.

18. The vehicle interior panel of claim 16, wherein air flowing in an axial direction upstream from the diffuser is discharged from the diffuser in a radial direction.

19. The vehicle interior panel of claim 16, wherein the diffuser has a closed condition at which air flow from the air discharge opening is blocked.

* * * * *